March 13, 1934.  H. C. PARKER  1,951,035
APPARATUS FOR RECORDING AND CONTROLLING
Filed March 23, 1928  2 Sheets-Sheet 1
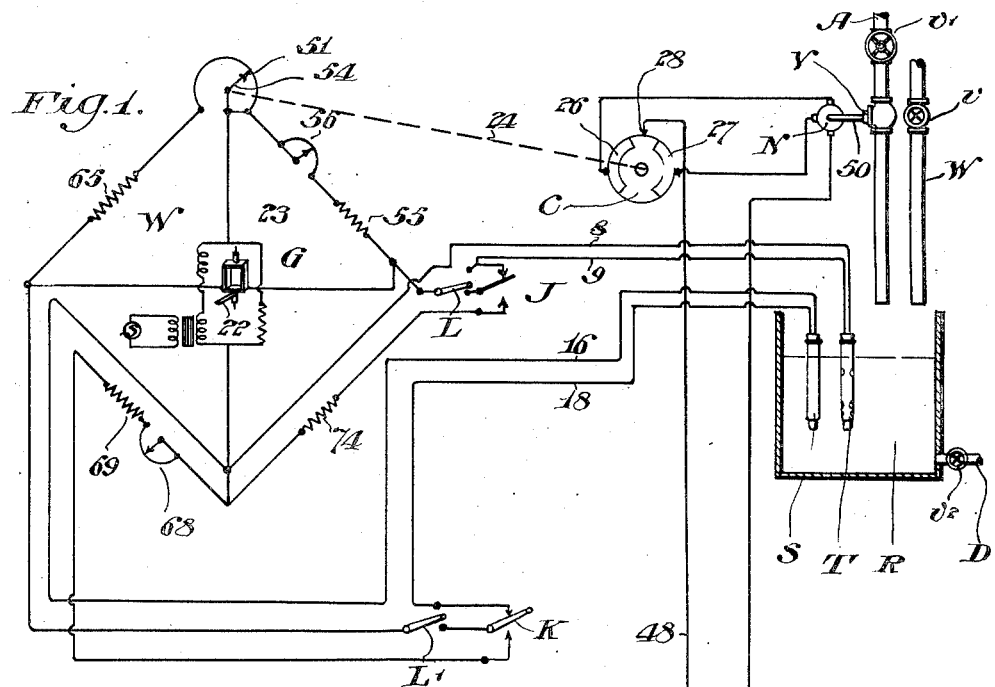
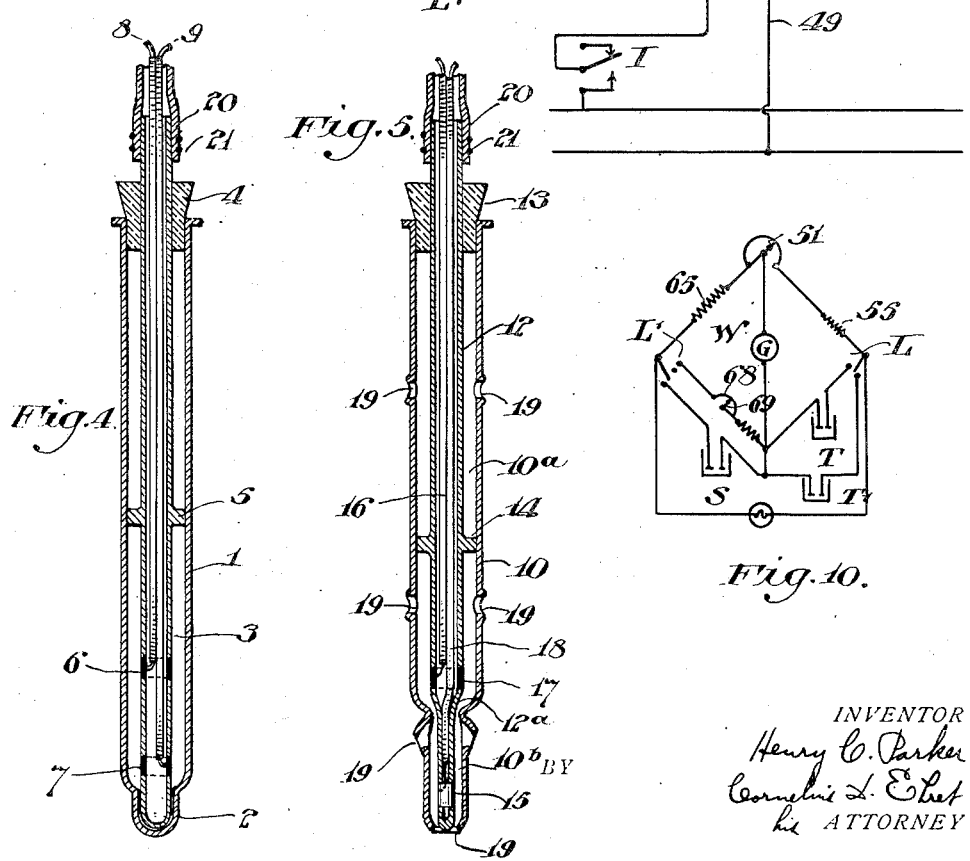
INVENTOR
Henry C. Parker
Cornelius L. Ebet
his ATTORNEY March 13, 1934.    H. C. PARKER    1,951,035
APPARATUS FOR RECORDING AND CONTROLLING
Filed March 23, 1928    2 Sheets-Sheet 2
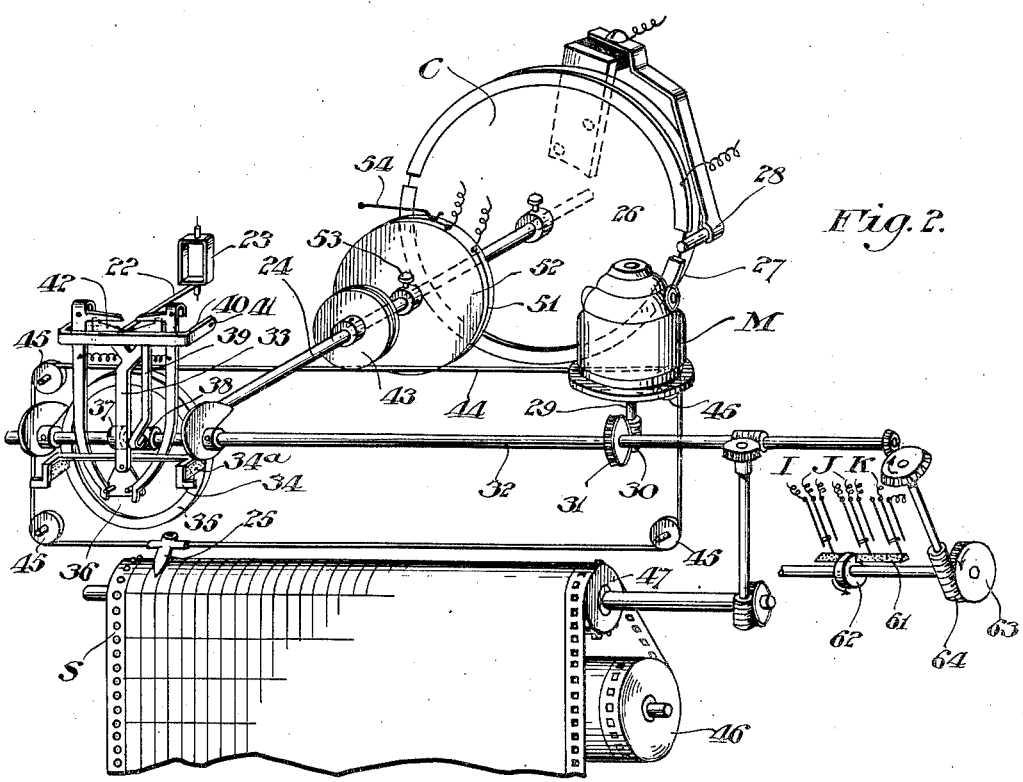

Patented Mar. 13, 1934

1,951,035

UNITED STATES PATENT OFFICE 1,951,035

APPARATUS FOR RECORDING AND CONTROLLING

Henry C. Parker, Philadelphia, Pa., assignor to Leeds & Northrup Company, Philadelphia, Pa., a corporation of Pennsylvania Application March 23, 1928, Serial No. 264,090

13 Claims. (Cl. 23—253)

My invention relates to a method and apparatus for measuring, recording or controlling, or recording and controlling a condition or property of a substance, as the concentration of an electrolyte.

My invention resides in a method and apparatus for measuring or recording the magnitude of a condition or property of a mass or substance, for example, the concentration of a solution, in terms of that condition or property of a standard, as of a solution of known or desired concentration, which comprises producing effects, as electrical potentials, proportional to the magnitudes of the condition of the substance and standard, and determining the ratio of the effects, as per cent. concentration of the solution in terms of the standard solution.

Further my invention resides in a method and apparatus for controlling the magnitude of a condition or property of a mass or substance, for example the concentration of a solution, to effect a value substantially equal to or having a desired ratio to that of a standard, as of a solution of known or desired concentration, by producing effects, as electrical potentials, proportional to the magnitudes, as of the concentrations of the respective solutions, and effecting a control of the condition or property of the substance, to maintain a desired ratio of said potentials.

Further my invention resides in a modified Wheatstone bridge apparatus having a variable impedance in an arm thereof and an actuating member therefor which effects a constant ratio of the values of the impedance before and after movement of the member for equal extents of movement throughout its range of movement. More particularly, a conductivity cell is in a second arm of the bridge, and still more particularly, an adjustably fixed linear temperature scale cooperates with the actuating member to permit compensation for change in the cell constant or for temperature changes.

Further and more particularly, to the aforesaid actuating member is adjustably fixed a plate having thereon a linear temperature scale cooperating with a fixed indicator and a second scale calibrated in concentration units cooperating with an index on the actuating member.

My invention further resides in features of construction hereinafter described and claimed.

For an illustration of an embodiment of my invention, reference is made to the accompanying drawings, in which:

Fig. 1 is a diagrammatic representation of one of the circuit arrangements utilized in accordance with my invention.

Fig. 2 is a perspective view of an indicating or recording and control mechanism embodying my invention.

Fig. 3 is a fragmentary elevational view of switches and their actuating or control mechanism.

Figs. 4 and 5 are sectional views in elevation of standard and test cells respectively.

Figs. 6 to 9 inclusive are detail views of variable resistances and calibrated indicating disks therefor.

Fig. 10 is a schematic wiring diagram of a system embodying my invention.

In Fig. 1 there is illustrated diagrammatically a system for applying to water, for example, another material, for example, a concentrated solution as of acid, to procure a product comprising a mixture of water and acid in predetermined proportions, or having a predetermined ion concentration, which is identical with or substantially approximates that of a standard solution, or which bears definite ratio thereto. The water, which represents generically any other material, is delivered through the pipe W, controllable by the manually operable valve $v$, into the mixing tank or reservoir R, into which is delivered acid (which term includes any other material or agent) through the pipe A controllable by the manually operable valve $v'$ and by the control valve V operable in opposite directions by the reversible electric motor N as hereinafter described. The mixture is discharged to any suitable region or point of use through the pipe D, controlled by the manually operable valve $v2$. Two cells T and S, test and standard cells, respectively, are mounted close together so that both are subjected to the same temperature variations of the mixture and in such position that the material from the valve V can reach the test cell only after being mixed with the solution. They are so placed that the agitation of the solution is sufficient to cause thorough mixing, but not where any bubbles of air incident to the mixing may come in actual contact with the test cell.

The standard cell S, Fig. 4, consists of an elongated tube or container 1, preferably of glass, having a depressed central portion 2 at its lower end which snugly receives and positions a second smaller tube 3 also of glass or the like, the upper end of which passes through and is positioned by the stopper 4, of rubber or other suitable material. The inner tube 3 may be provided with guiding projections or fins 5 which engage the inner wall of the outer container and assist in procuring and maintaining proper alignment. Near its lower end, the tube 3 is encircled by two spaced bands of gold or other suitable metal which constitute the electrodes 6 and 7 of the standard cell. The flexible conductors 8 and 9 insulated from each other, as by a series of small glass beads, extend into the tube and pass through a wall thereof into electrical contact with electrodes 6 and 7 respectively.

The test cell T consists of an elongated tube 10, preferably of glass, having an upper chamber 10a and a lower chamber 10b of smaller cross-section. A tube 12, preferably of glass or the like, is adjustably positioned within tube 10 by a stopper 13, of rubber or other suitable material, and is provided with guide tips or projection 14. Encircling the lower, reduced tip of tube 12, which is normally positioned within chamber 10b, is a band 15 of gold or other suitable metal to which is connected a conductor 16 extending through the interior of tube 12. Spaced from and encircling the tube 12 within chamber 10a, is a second band 17, similar to band or ring 15, to which is connected an electrical conductor 18 also extending interiorly of tube 12 and suitably insulated from conductor 16. By moving tube 12 longitudinally of tube 10 when electrically conductive liquid is disposed therein, the electrical resistance between electrodes 15 and 17, positioned within chambers 10b and 10a respectively, is varied since the cross-sectional area of the communicating passage, and therefore of the conductive liquid, between the chambers, depends upon the position of the tapered portion 12a of tube 12. For example, when tube 12 as shown in Fig. 5, is moved downwardly the portion 12a more nearly closes the upper end of chamber 10b increasing the resistance of the conductive path between electrodes 15 and 17.

The resistance of the path between the electrodes of a conductivity cell varies as the ratio of the length of the path to its cross-sectional area. Consequently, the movement of tube 12 as described, varies the constant of the test cell T by varying the ratio of the length of the path between the electrodes 15 and 17 to the area of the path; specifically by changing the area at the restriction of the path formed by the tapered portion 12a of tube 12 and the lower chamber 10b of tube 10.

In order that the conductivity of the solution between the electrodes be representative of an existing condition of the changing solution in which the test cell is immersed, the tube 10 is provided with a plurality of suitably disposed apertures 19 which permit admission and free circulation of the electrolyte to and within the chambers.

The apertures also permit the electrodes 15 and 17 to be cleaned by dipping the whole cell in a cleaning solution without removing or altering the position of tube 12 which would change the calibration of the cell.

The upper, open ends of the tubes 3 and 12 are each received by a flexible, protecting tube 20 suitably secured thereto, as by clamping rings or helices 21, and through which the electrode leads or conductors pass to apparatus hereinafter described.

The conductivity of the liquid path between the electrodes 15 and 17 of the test cell T varies in magnitude with variations in magnitude of the condition to be controlled, in a self-balancing Wheatstone bridge W with which coacts a galvanometer G having as indicated in Fig. 2, a needle or pointer 22 actuated by a movable or deflecting system or coil 23 for controlling a mechanism which may alternately operate as a recorder and a controller. Both the recording and controlling operations are effected by and in accordance with the angular movements of the shaft 24. For recording, the shaft 24 controls movement of the marker or pen 25 transversely of the continuously moving record sheet or paper s. For controlling, the shaft 24 rotates the disk C, adjustably secured thereto, and carrying the contacts 26 and 27, which, in cooperation with the stationary contact 28, control the aforesaid valve-actuating motor N.

The control and/or recording mechanism may be of any suitable character, and may, for example, and preferably, be generally of the character described in Letters Patent to Leeds No. 1,125,699, January 19, 1915.

Briefly, this mechanism, Fig. 2, comprises the electric motor M whose shaft 29 drives at substantially constant speed the worm 30 meshing with and driving gear 31 secured upon and driving shaft 32. Pivoted upon a horizontal axis adjacent its upper end is a lever 33, upon which there is pivoted on a horizontal axis the arm 34, on each end of which is a shoe of cork 34a or the like frictionally engaging the rim 35 of the clutch disk 36 secured upon the aforesaid shaft 24. Secured upon the shaft 32 is a cam 37 which periodically engages the lever 33 and moves it outwardly away from the clutch disk 36 in opposition to a spring, not shown, thereby lifting shoes 34a free from the rim 35, the spring returning the shoes into engagement with the rim after predetermined rotation of the cam 37. Upon the shaft 32 is secured a second cam 38 which, after cam 37 has lifted the shoes 34a from rim 35, actuates the arm 39 secured at its upper end to the bail member 40 pivoted at 41. Upon the member 40 is secured the member 42 whose upper edge is inclined and increases in height from the center toward each side. Disposed immediately above the inclined edge is the aforesaid needle or pointer 22 of galvanometer G whose deflections are limited by abutments attached to or integral with member 42.

As well understood, the deflections of the galvanometer needle 22 cause rotations of the shaft 24 to extents and in directions proportional to or dependent upon the extents and directions of deflections of the needle. Upon the shaft 24 is secured the grooved pulley 43 around which passes the cord 44, passing over the idler pulleys 45, for moving the aforesaid marker or pen 25 transversely of the record sheet s, which latter is stored upon a roll 46 and passes over the sprocket roll 47 driven through suitable gearing from the shaft 32.

Reverting to Fig. 1, the contact 28 is connected, when the switch I is closed, with the conductor 48 of a current supply circuit, for example, of the direct current type, whose other conductor 49 connects with a terminal of reversible motor M, the direction of rotation of whose armature is dependent upon which of contacts 26 and 27 is in engagement with contact 28. The shaft 50 of the motor through suitable reduction gearing, not shown, rotates the valve V.

The slide wire 51 is supported on the periphery of a disk 52, adjustably secured to the shaft 24, as by set screw 53, and is in continuous wiping engagement with a fixed contact finger 54.

Included in the arm of the bridge between the slide wire contact 54 and the test cell T, is a fixed resistance 55 and a rheostat 56 which as shown in Figs. 6 and 7 comprises a shaft 57 having affixed thereto at one end a finger 58 in electrical contact with a resistance element 59, and at the other end, a calibrated dial or disk 60 adapted to be manually manipulated to vary the position of contact 58.

The standard cell S is filled with a solution of the desired concentration and both the test cell T and standard cell S are immersed in a receptacle containing the same solution. The constant of the test cell is brought to approximately the same value as that of the standard cell by manually raising or lowering the tube 12 as above described. This condition obtains when the recorder is balanced and the tracing pen 25 occupies a position substantially central of the recorder sheet, indicating that the solutions are of equal concentration, that is, the concentration of the solution in which the test cell is disposed is 100% of that of the solution in the standard cell.

To compensate for differences in cell constants the rheostat 56 may be adjusted until the recorder balances at exactly 100% concentration as indicated by recorder pen 25. The disk 60 may be loosened and rotated with respect to shaft 57 until the zero mark thereon is opposite a suitable indicator whereupon it is again made fast to the shaft 57, the contact 58 remaining in its adjusted position. Adjustment of the rheostat does not change the range of the recorder shown in Fig. 2 the range of which may be from 60% to 120%. In other words the highest concentration is twice that of the lowest value and this relation maintains for all positions of the contact 58. In the conventional bridge circuit in which the slide wire 51 is disposed in two arms of the bridge and not in a single arm as disclosed in Fig. 1, dial 60 and contact 57 could not be used to compensate for change of cell constant as the range of the recorder would be changed.

After these preliminary steps, the standard cell containing the solution of desired concentration and the test cell are immersed in the liquid, within the reservoir R, whose concentration in terms of that of the standard solution is to be recorded or controlled, or both recorded and controlled. As the differences in concentration are relatively small, the concentrations vary directly with the conductances of the respective solutions. The concentration of the standard solution being fixed by selection, the motions of the recording pen, 25, are proportional, within the range of the recorder, to the departures in per cent. of the concentration of the test solution from that of the standard solution. For example, if the standard solution is 3% acid and the recorder reading is 90%, the concentration of the test solution is 90% of this or 2.7% and if the standard solution is 5% acid and the recorder reading is the same, 90%, the concentration of the test solution is 4.5%, etc. The recorder scale is linear when calibrated in concentration or conductance as the bridge circuit, of the character described in my copending application Serial No. 162,692, filed January 22, 1927, upon which has issued Letters Patent 1,840,635, is characterized by the inclusion of the slide wire resistance 51 in a single arm of the bridge.

Alternatively, the recorder sheet could be scaled to directly indicate the per cent. departure from the desired concentration in which instance, the 100% mark of the scale shown would be the zero of the new scale, the 90% graduation would be the −10% point, the 110% mark would be +10% point, etc.

Referring to Figs. 1, 2 and 3, for simple on-off type of control, screw 66 is loosened and plate 67 swung to effect disengagement of worm wheel and gear 63 and 64, respectively. The shaft 59 of worm wheel 64 is rotated until the insulating member 61 connecting switches I, J and K and engaging cam 62 is in such position that switch I is in closed circuit position. The switches L and L1, Fig. 1, are moved to their upper position to include the standard and test cells in the bridge circuit.

If the concentration of the test solution is equal to or bears the desired relation to that of the standard cell, the pointer 22 of the galvanometer G is not deflected and the control shaft remains stationary, and, it may be assumed for the purpose of explanation, with contact 28 midway between contacts 26 and 27 of the control disk C. Upon departure of the concentration of the test solution from the desired value, the member 22 is deflected and effects rotation of shaft 24 and control disk C as above described to an extent proportional to the departure. Stationary contact 28 engages contact 26 or 27 of the control disk to effect rotation of the motor N and of valve V actuated thereby in a direction to correct for the change in concentration by increasing or decreasing the flow of reagent through pipe W.

In order to effect a change in the controlled concentration, the solution in the standard cell may be changed to correspond to the change desired. Alternatively, and especially if the change is a small one, it can easily be effected by adjusting the rheostat 56. The resistance of the rheostat 56 is preferably equal to that of the fixed resistance 55 and is of such a value that, when standard and test solutions are identical and when the recorder pen is opposite the 100% graduation of sheet s, the zero mark of dial 60 is opposite its index and the resistance of the rheostat 56 is then approximately half in circuit. The normal range of the recorder shown in Fig. 2 may be from 60% to 120% for example, in which case the dial 60 may be rotated, for example, ten divisions to effect an approximate change of 10% in the controlled concentration. The controlled concentration is increased when rotation of dial 60 causes the record to indicate lower concentrations, and vice versa.

To produce a type of control in which periods of recording and controlling, of any suitable relative lengths, alternate with each other, and in which there is time-lag between the termination of one control period and the inception of another to allow ample time for the control to take effect, an arrangement described in my copending application Serial No. 134,427, filed September 9, 1926, may be effected by restoring engagement between worm wheel and gear 63 and 64, and moving switches L and L1 to their lower positions.

During the recording period, the switch J is in its upper position connecting the test cell T in circuit as an arm of the bridge circuit W, and similarly, the switch K is in its upper position connecting the standard cell S in circuit as an adjacent arm of the bridge. During this period, the switch I, is in the open circuit position, and the system comprises a self-balancing Wheatstone bridge apparatus, the recorder pen 25 producing upon the sheet *s* a record of the per cent. concentration of the solution in reservoir R.

The switches I, J and K as above stated are mechanically connected by an insulating member 61, Figs. 2 and 3, constituting a follower for the cam 62 secured upon the shaft 59 driven through reduction gearing 63, 64 by the shaft 32. The ratio of the recording and control periods is determined by the contour of the cam 62, which, when the follower 61 is upon the cam surface of large diameter, holds the switches I, J and K closed in the positions indicated for recording. When the follower passes onto the cam surface of lesser diameter, a control cycle or period is instituted, and the switches I, J and K move against their lower contacts, Fig. 1.

During a control period, the switch I, in effect a motor control switch, is brought into electrical communication with the control contact 28, to permit the contact 26 or contact 27 to cause rotation of the motor N in one direction or the other in the event that the concentration of the solution is not of the desired magnitude. If at the beginning of the control period, the concentration of the solution in the reservoir is 100% of that in the standard cell, the control mechanism will not operate, because the contact 54 will have been moved along the slide wire 51 during the preceding recording period to a point corresponding to 100% concentration, and in so doing the disk C, mounted on same shaft 24, will have rotated to such a position that the contact 28 is midway between contacts 26 and 27. The circuit of the motor N is therefore broken at this point and the setting of valve V is undisturbed. If on the other hand, at the beginning of the control cycle, that is, at the end of the recording period, the concentration is at some other than the desired per cent., the shaft 24 of the mechanism shown in Fig. 2 will have rotated the resistance 51 with respect to contact 54, in producing the record, up to the termination of the preceding recording period, to such position that contact 28 engages either contact 26 or 27, affixed to disk C, according to whether the concentration of the controlled solution is greater or less than that of the standard solution in cell S. When the switch I is then closed at the start of a control cycle, the motor circuit is completed and the valve V starts gradually opening or closing according to whether the variable concentration is above or below the desired value.

At the end of the control period which may be relatively short, the switches I, J and K are again moved to their upper position completing the circuit of the bridge W. As before, the pen 25 records on sheet *s* the then existing concentration and if it be other than the desired magnitude, the control shaft 24 is again rotated as above described to effect engagement between contact 28 and either contact 26 or 27 as above described. If it is desired to change the concentration of the solution in the reservoir or tank R, the standard cell may be removed, emptied and refilled with a new solution of the desired concentration. Alternatively, rheostat 68 (dial 68') may be used to effect small changes in controlled concentration.

Preferably with this type of control the resistance 69 is not variable. To effect change of the controlled concentration, there is provided adjustable resistance or rheostat 68, having a dial 68' calibrated to correspond with the scale of recorder sheet *s*.

Contact 28 is geared to rheostat 68 (dial 68') in such a manner that an angular motion of dial 68 produces an equal angular rotation of contact 28, relative to the contacts 26 and 27. In this manner the action of the mechanism is so arranged that, during a control cycle, the recording pen always returns to a position on scale *s* to correspond to the setting of dial 68' and, at the same time, the disk 24 revolves to the point where contact 28 falls midway between contacts 26 and 27. During the revolution of disk 24 the valve operates in such a direction as to change the controlled concentration to agree with the setting of dial 68'.

With a Wheatstone bridge circuit of the character described, the dial 68' may be set for example, at the 90% mark and the recorder mechanism will come to balance at the 90% point of the recorder sheet, during the control period of the cycle, while the concentration of the test solution is controlled at 90% of that of the standard solution. The rheostat 68 is preferably constructed, as hereinafter described, in such manner that the calibration marks of dial 68' are equally spaced throughout the scale range. The adjustment in either instance effects a control of the rate of application of the agent flowing through conduit A, causing change in the concentration of the solution in reservoir R when and if the concentration desired is other than that corresponding to the setting of dial 68'.

By way of example of another use to which the fundamental circuit and apparatus may be applied, reference is to be had to Fig. 10, disclosing the measuring or recording circuit of Fig. 1 in modified form. In many industries, a dilute solution is made from a concentrated solution and it is desired to measure the per cent. concentration of the dilute solution in terms of the more concentrated. A representative portion of the concentrated solution may be placed in the standard cell S and the cell immersed in the reservoir R in which the dilution is effected and in which the test cell T is immersed, or the electrodes 6 and 7 may be placed in direct contact with the concentrated solution at its source and before passage through conduit A or W.

The concentration of the solute of Fig. 10 may be determined in such terms as grains per gallon of dissolved solids, for example, by balancing the recorder when both cells S and T are in circuit and operating at the same temperature, whereupon the recorder is then stopped and the switch L moved to its upper position, Fig. 10, substituting the rheostat 68 and fixed resistance 69 for the cell S in the bridge circuit. The rheostat knob 73, Fig. 8, fixedly attached to shaft 70 at the other end of which is secured movable contact arm 71, is turned until the galvanometer is again balanced. It is then evident that the total resistance of the units 68 and 69 is equal to that of the cell, S.

If it is desired only to record the per cent. concentration of the dilute solution, the clamping screw 66, Fig. 3, may be loosened permitting the plate 67 to be swung clockwise which disengages worm 64 from worm gear 63. The switches I, J and K throughout operation of the apparatus remain in their upper circuit position as shown in Fig. 1 including the cells S and T in the bridge circuit to produce a continuous record.

The rheostat resistance unit is so constructed that for equal increments of movement of knob 69, the ratio of the resistances before and after movement for a given angular displacement is the same throughout the range of movement. This effect may be produced by progressively increasing or decreasing the cross-sectional area of the wire; the length of wire between successive convolutions, if a coil; the spacing between adjacent turns, etc. This tapering is also so selected that a given displacement corresponds to the change in resistance of the solution over a given temperature range, which not only makes possible a linear temperature scale as hereafter mentioned but also provides that compensation may be secured at any point along the resistance by the same angular displacement of knob 69.

When the circuit is balanced as above, a screw 72 is loosened permitting independent rotation of dial 73 to a position in which the temperature indicated by its linear temperature scale corresponds to that of the cells T and S. The arrow or pointer on knob 69 then indicates on the second, calibrated inner scale of dial 73, the correct concentration of the solute, for example, in grains per gallon, since the resistance of the rheostat is equal to that of the substituted cell, and the temperature correction has been applied by manipulation of dial 73.

If desired, the cell S may be left out of service and a check made only when the concentration of the standard solution or solute is changed, in which case the dial 73 may be used as a manually operable temperature compensator.

The circuit arrangement of Fig. 10 and mechanism of Fig. 2 may also be utilized to measure the apparent leakage of a cooling solution, as brine, in a condensate or the apparent leakage of a surface condenser, for example, each in terms of per cent. of the cooling solution. Either cell T or T1 may contain condensate and the other may contain a condensed steam sample extracted from the steam line from a boiler. To check the recorder the cell S is filled with a sample of the cooling solution heated to the temperature of cells T and T1, cell S and either cell T or T1 are then conected, by movement of switch L, Fig 10, in the Wheatstone bridge circuit described. After the mechanism of Fig. 2 balances the circuit in the manner above described, the resistances 68 and 69 are substituted for cell S by movement of switch L1, Fig. 10, to the upper position. The dial 73 is then released and independently rotated to read the temperature of the two cells as described above. The recorder mechanism may be of the "two point" type generally of the character described in United States Letters Patent to Leeds, 1,125,699, granted January 19, 1915, and in which the cells T and T1 are alternately connected in circuit and records of apparent leakage of the cooling solution in the condensate and the steam respectively, are made. Apparent leakage may be defined as that per cent. of cooling solution which when added to pure distilled water results in the same conductivity. True leakage of the cooling liquid in the condensate is obtained by subtracting the reading of the steam cell from that of the condensate cell. The reading of the steam cell alone may be interpreted as per cent. moisture in the steam, by multiplying the steam cell readings by the ratio of the conductances and ionization factors of the boiler water and the cooling liquid, respectively. The adjustable resistance 68 having dial 73 may be used as a temperature compensator, after calibration as described above.

By keeping the cells T, T1, at the same temperature or compensating for differences in temperature, and by obtaining proper relation between resistances 55, 56, 51 and 65, the recorder sheet may be graduated in per cent. for the desired range. For example, if a scale is desired from 0 to 10%, and if the ionization factor obtained by dividing the resistance of a 1% solution by that of the solute or concentrated solution is 95, assuming that the conductance of pure distilled water is zero, and that the cell constants are equal, then resistance 65 should be zero, and the sum of resistance 55 and the utilized portion of 56 should have 9.5 times the resistance of slide wire 51.

For brevity in the appended claims the term "determine" is utilized in a generic sense when there is no inconsistency to comprise the measuring of, and/or recording of, and/or controlling of, the magnitude of a condition or property of a mass.

What I claim is:

1. Means for determining the concentration of a solution in terms of a standard solution comprising a conductivity cell having electrodes immersed in the solution, a second conductivity cell having electrodes immersed in a standard solution, means to compensate for the difference in the constants of said cells, and an electrical network including said conductivity cells and said compensating means capable of being balanced to determine the ratio of the conductances of the solutions between the electrodes of the respective conductivity cells.

2. A conductivity cell comprising a hollow member adapted to contain a liquid and having chambers connected by a passage of restricted cross-section, a member disposed in said hollow member, having a tapered portion within said passage spaced electrodes disposed respectively in said chambers affixed to said second mentioned member and movable therewith as a unit with respect to said hollow member to vary the conductivity of the liquid path between said electrodes.

3. A conductivity cell adapted to be immersed in a liquid comprising a hollow, apertured member having chambers connected by a passage of restricted cross-section, a member disposed in said hollow member, having a tapered portion within said passage spaced electrodes disposed respectively in said chambers affixed to said second mentioned member and movable therewith as a unit to vary the conductivity of the liquid path between said electrodes.

4. A Wheatstone bridge including conductivity cells in adjacent arms thereof, an impedance wholly within a third arm of said bridge, means to adjust said impedance to equal extents to balance said bridge for equal increments of change of conductivity of one of said cells, a scale associated with said means having a uniformly divided scale, a fixed impedance, and a variable resistance in series with said fixed impedance in a fourth arm of said bridge, the maximum value of said impedance being substantially equal to the value of said fixed impedance.

5. A system for controlling the concentration of a solution to maintain a desired relation to the concentration of a standard solution which comprises a Wheatstone bridge, conductivity cells in adjacent arms thereof containing said solution and said standard solution respectively, control structure for varying the concentration of said solution, an impedance wholly in another arm of said bridge, and means effecting movement of said control structure and adjustment of said impedance, movable to equal extents for equal increments of change of conductivity of said solution.

6. A system for controlling the concentration of a solution to effect a desired relation to the concentration of a standard solution which comprises a Wheatstone bridge, conductivity cells in adjacent arms of said bridge containing said solution and said standard solution respectively, control means for varying the concentration of said solution, an impedance wholly in another arm of said bridge, means effecting actuation of said control means and adjustment of said impedance movable to equal extents for equal increments of change of conductivity of said solution, an impedance in a fourth arm of said bridge adjustable to vary the relation between the concentration of the solution and the concentration of the standard solution, and a linear scale associated with said second adjustable impedance.

7. A system for alternately recording and controlling the concentration of a solution which comprises a Wheatstone bridge network, conductivity cells in adjacent arms of said bridge containing said solution and a standard solution respectively, an impedance wholly within another arm of said bridge, means to adjust said impedance to equal extents to balance said bridge for equal increments of change of conductance of the solution, recorder mechanism associated with said means, control means for varying the concentration of the solution, an impedance, a scale associated with said impedance to permit setting of said impedance to change the relation between the concentration of the solution and the concentration of the standard solution, and switching mechanism operating periodically to include said impedance in the bridge and simultaneously to exclude said cells from the bridge to effect rebalance thereof, and to effect actuation of said control means during the rebalancing.

8. A system for measuring the leakage of a cooling solution in a condensate comprising a Wheatstone bridge, a conductivity cell containing condensate in one arm of said bridge, a conductivity cell containing cooling solution heated to the temperature of said condensate in a second arm of said bridge, an impedance wholly in a third arm of said bridge, means for adjusting said impedance and movable to equal extents for equal increments of change of conductivity of said condensate, and a linear percentage scale associated with said means.

9. A system for measuring the leakage of a cooling solution in a condensate comprising a Wheatstone bridge, a conductivity cell containing condensate in one arm of said bridge, a second conductivity cell containing cooling solution heated to the temperature of said condensate in a second arm of said bridge, an impedance wholly in a third arm of said bridge, means for adjusting said impedance and movable to equal extents for equal increments of change of conductivity of said condenser, a linear percentage scale associated with said means, an impedance, a member cooperating with said impedance to effect a constant ratio of the values of said impedance before and after movement of said member for equal increments of movement throughout its range, a linear temperature scale associated with said member, and means for including said impedance in and excluding said second conductivity cell from said second arm of the bridge.

10. A measuring system comprising a Wheatstone bridge, a conductivity cell containing condensate from a condenser, a conductivity cell containing a condensed steam sample from a steam line, means selectively to include one of said cells in an arm of said bridge, an impedance wholly in a second arm of said bridge, means for adjusting said impedance and movable to equal extents for equal increment of change of conductivity of cell in circuit in said first arm, a linear percentage scale associated with said means, a conductivity cell containing heated cooling solution, an impedance, means for adjusting said impedance cooperating therewith to effect constant ratio of the values thereof for equal increments of movement throughout the range of movement, a linear temperature scale associated with said second means, and means selectively to include said third conductivity cell or said impedance in a third arm of said bridge.

11. A Wheatstone bridge comprising a conductivity cell containing a solution in one arm of said bridge, a second conductivity cell containing a standard solution in an adjacent arm of said bridge, a fixed impedance in the arm of said bridge conjugate to said second arm, a variable impedance wholly in the arm of said bridge conjugate to said first arm, and a linear percentage scale associated with said variable impedance.

12. A Wheatstone bridge comprising a conductivity cell containing a solution in one arm of said bridge, a second conductivity cell containing a standard solution in an adjacent arm of said bridge, a variable impedance wholly in the arm of said bridge conjugate to said first arm, a linear percentage scale associated therewith, and a normally fixed impedance in the bridge arm conjugate to said second arm adjustable to compensate for difference in the constants of said cells.

13. A system for measuring and controlling the concentration of a solution comprising a self-balancing Wheatstone bridge, a conductivity cell containing said solution in one arm of said bridge, a conductivity cell containing a standard solution in an adjacent arm of said bridge, an impedance adjustable to balance said bridge disposed wholly in the arm conjugate to said first arm, a linear percentage scale associated with said impedance, structure for controlling the concentration of said solution movable upon adjustment of said impedance, and switching means for including said cells in said bridge during a measuring period to determine the percentage concentration of said solution with respect to the concentration of said standard solution, for substituting therefor during a control period impedances whose magnitudes are of the desired ratio of the concentrations of the solution to the standard solution to effect rebalance of the bridge, and substantially simultaneously with said substitution rendering said structure effective to control.

HENRY C. PARKER.